(12) United States Patent
Dawra et al.

(10) Patent No.: US 7,375,657 B2
(45) Date of Patent: *May 20, 2008

(54) METHOD AND SYSTEM FOR PERFORMING STREAMING OF ENCODED DATA

(75) Inventors: Anshul Dawra, San Jose, CA (US); Bilung Lee, Fremont, CA (US); Paul Arnold Ostler, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,970

(22) Filed: May 8, 2007

(65) Prior Publication Data

US 2007/0205924 A1 Sep. 6, 2007

Related U.S. Application Data

(63) Continuation of application No. 11/304,799, filed on Dec. 14, 2005, now Pat. No. 7,259,697.

(51) Int. Cl.
*H03M 7/00* (2006.01)

(52) U.S. Cl. .......................... 341/50; 341/51; 709/230; 709/231; 709/246; 725/115; 725/145

(58) Field of Classification Search ...................... None
See application file for complete search history.

(56) References Cited

U.S. PATENT DOCUMENTS

| | | | |
|---|---|---|---|
| 5,317,690 A | 5/1994 | Krzycki et al. | |
| 6,370,581 B2 | 4/2002 | Rader | |
| 6,542,541 B1 | 4/2003 | Luna et al. | |
| 6,593,860 B2 | 7/2003 | Lai et al. | |
| 6,601,108 B1 | 7/2003 | Marmor | |
| 6,859,840 B2 | 2/2005 | Singal et al. | |
| 7,028,096 B1 | 4/2006 | Lee et al. | |
| 7,120,751 B1 | 10/2006 | Endo et al. | |
| 7,155,531 B1 | 12/2006 | Lango et al. | |
| 7,167,925 B2 | 1/2007 | Marmor | |

FOREIGN PATENT DOCUMENTS

WO  WO0120910  3/2001

*Primary Examiner*—Khai M Nguyen
(74) *Attorney, Agent, or Firm*—Sawyer Law Group LLP

(57) ABSTRACT

A computer readable medium encoded with a computer program for performing streaming of character-based data from a storage system is provided. The computer program comprises code for fetching a block of data from the storage system, wherein the character-based data includes the block of the data; converting a portion of the block of the data into a part of a character; retaining a remaining part of the block, if any, the remaining part of the block of the data corresponding to a portion of the character and a portion of an additional character; and converting the remaining part of the block of the data into one of the portion of the character and the portion of the additional character in a next conversion responsive to the next conversion including the character or the additional character.

9 Claims, 3 Drawing Sheets

METHOD AND SYSTEM FOR PERFORMING STREAMING OF ENCODED DATA

CROSS-REFERENCE TO RELATED APPLICATIONS

This application is a continuation of application Ser. No. 11/304,799, filed Dec. 14, 2005, now U.S. Pat. No. 7,259,697, the entire contents of which are incorporated herein by reference.

FIELD OF THE INVENTION

The present invention relates to data processing, and more particularly to a method and system for efficiently performing streaming of character data.

BACKGROUND OF THE INVENTION

Data streaming permits data to be obtained from storage on an as needed basis. In data streaming, data is requested from the storage system—e.g., a file or database system. Chunks of data are obtained sequentially until a request is fulfilled. Typically, each chunk of data in the sequence includes a specified number of bytes. Thus, conventional data streaming typically fetches equal-sized chunks of data in order until sufficient data has been obtained to fulfill the request.

Character-based data includes encoded data that is used to represent characters. For example, character-based data may be stored through mixed-byte encoding. Mixed-byte encoding utilizes a varying number of bytes to encode each character. However, other encoding schemes may be used. Such encoding schemes may vary the number of bytes that are used to encode a character, or may use a fixed number of bytes to encode a character. Character-based data can be converted into characters (e.g., text).

Data streaming may be desired for character-based data. FIG. 1 depicts a conventional method 10 for performing streaming of character-based data that may be encoded using an encoding having a variable number of bytes per character (such as in mixed-byte encoding). FIG. 2 depicts a conventional system 30 for performing streaming of character-based data. The system 30 includes an input stream reader 32, a client 34, and a storage system 40 used to store the data. Referring to FIGS. 1 and 2, a request for character-based data is provided to the input stream reader 32 from the client 34 (step 12). The request is from a user and is, therefore, typically for a fixed number of characters. Thus, for mixed-byte encoding, requests for the same number of characters may vary in length based upon the number of bytes used to represent the characters.

The input stream reader 32 fetches from the storage system 40 a sufficient amount of character-based data to satisfy the request (step 14). The input stream reader 32 converts the character-based data that has been fetched into characters (step 16). The number of characters sufficient to fulfill the request is provided to the client 34 (step 18). Thus, the fixed number of characters is output in step 18. Any remaining data is discarded (step 20).

Although the conventional method 10 and system 30 function, the method 10 and system 30 are inefficient. As discussed above, the request is for a fixed number of characters. However, for encoding schemes such as mixed-byte encoding, the same number of characters may correspond to differing numbers of bytes of character-based data. The exact amount of character-based data for the fixed number of characters in a particular request is unknown. As a result, a sufficient amount of data to satisfy any request, not just the request at hand, is fetched in step 14. Thus, a large amount of data (e.g., an entire document) is typically fetched in step 14. However, the request may be only for a small portion of the document. Consequently, a large amount of data may be unnecessarily fetched, converted, and then discarded.

Other conventional methods for performing character-based data streaming may function as conventional data streaming. In such conventional methods, a request is made and a fixed number of bytes is fetched and converted using the converter (input stream reader) 32. This process is repeated, fetching and converting sequential chunks of data, until the request is fulfilled. However, such a conventional method may not be capable of handling encoding schemes in which the number of bytes per character varies, e.g., mixed-byte encoding. This is because a chunk of the character-based data may not correspond to a whole number of characters.

SUMMARY OF THE INVENTION

In general, in one aspect, this specification describes a computer readable medium encoded with a computer program for performing streaming of character-based data from a storage system is provided. The computer program comprises computer executable code for fetching a block of data from the storage system, wherein the character-based data includes the block of the data; converting a portion of the block of the data into a part of a character; retaining a remaining part of the block, if any, the remaining part of the block of the data corresponding to a portion of the character and a portion of an additional character; and converting the remaining part of the block of the data into one of the portion of the character and the portion of the additional character in a next conversion responsive to the next conversion including the character or the additional character.

According to the method and system disclosed herein, the present invention provides an efficient mechanism for performing character-based data streaming, particularly for encoding schemes in which a number of bytes per character varies.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates to data processing, and more particularly to a method and system for efficiently performing streaming of character data. The following description is presented to enable one of ordinary skill in the art to make and use the invention and is provided in the context of a patent application and its requirements. The present invention is not intended to be limited to the embodiments shown, but is to be accorded the widest scope consistent with the principles and features described herein.

The present invention provides a method and system for performing streaming of character-based data. The method and system comprise fetching a block of data and converting at least a portion of the block of the data into at least a part of a character. The character-based data includes the block of the data. The method and system also comprise retaining a remaining part of the block, if any. The remaining part corresponds to at least a portion of the character or at least a portion of an additional character. The method and system further comprise converting the remaining part into at least the portion of the character or at least the portion of the additional character in a next conversion if the next conversion includes the character or the additional character.

The present invention will be described in terms of a particular computer system and a particular encoding scheme. However, the method and system described herein could be used in another computer system and another encoding scheme. In addition, the present invention is described in the context of particular methods. However, steps may be omitted or merged (or performed in a different order) and still achieve desirable results.

Figure 1:
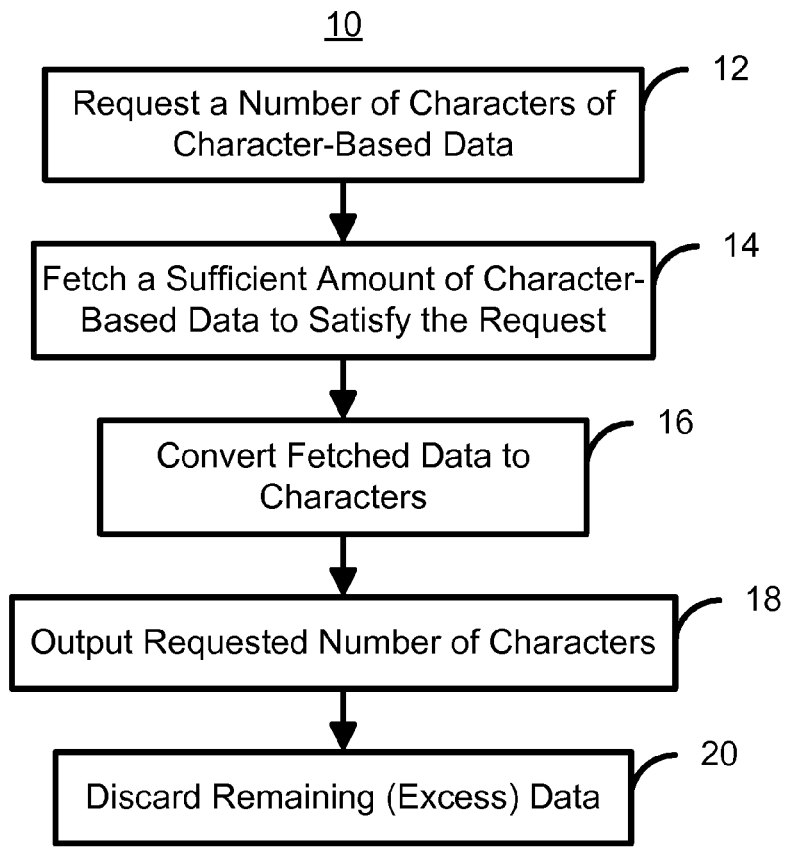
FIG. 1 is a flowchart depicting a conventional method for performing data streaming of character-based data.
Figure 2:
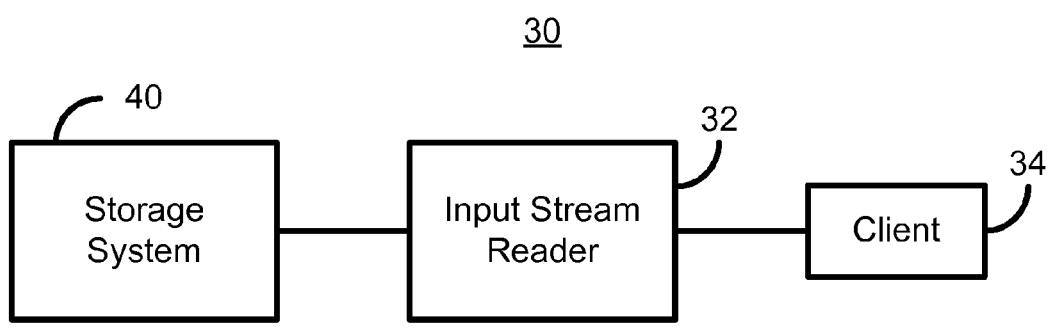
FIG. 2 is a diagram of a conventional system for performing data streaming of character-based data that may use an encoding scheme having a variable number of bytes per character.
Figure 3:
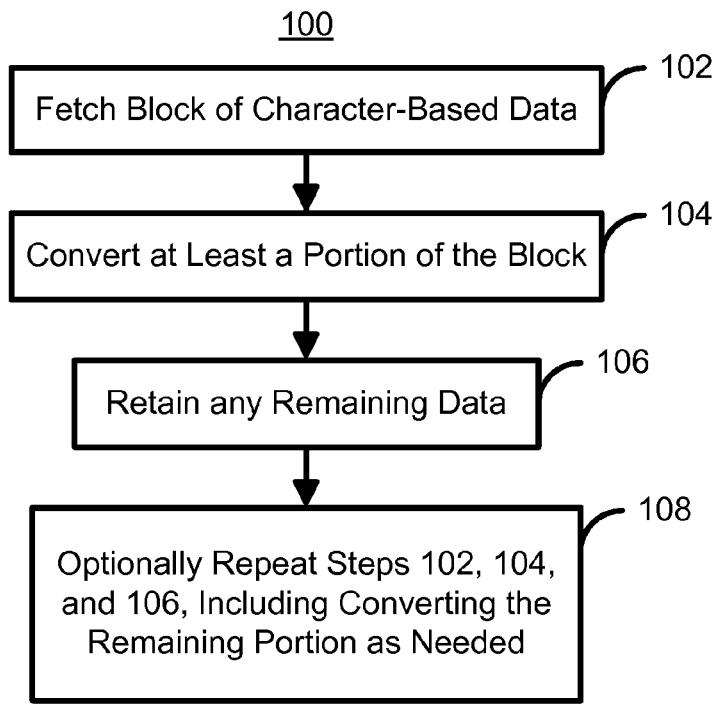
FIG. 3 is a flow chart depicting one implementation of a method in accordance with the present invention for performing data streaming of character-based data.

FIG. 3 depicts a flowchart of a method 100 for performing data streaming of character-based data. The method 100 may be use in conjunction with an encoding scheme having a variable number of bytes per character (e.g., mixed-byte encoding). In one implementation, the method 100 can be used with another encoding scheme, including encoding schemes that use a fixed number of bytes per character. The method 100 can be performed in response to a request for character-based data stored in a storage system (e.g., a file or database system). In one implementation, the request is for a particular number of characters. Consequently, the request may correspond to a variable number of bytes of character-based data.

Referring to FIG. 3, a block of the character-based data is fetched from the storage system (step 102). In one implementation, the block has a fixed size. Thus, the block may correspond to a varying number of characters. In addition, the block may not correspond to a whole number of characters. For example a block may include n bytes, where n is an integer. A portion, m bytes, of the character based data may correspond to an integral number of characters p. Note that in one implementation, m might not be an integer, but instead could include a fraction. Thus, (in one implementation) the block corresponds to p characters, with n–m bytes of character-based data remaining after the p characters are obtained through the conversion. The n–m bytes of character-based data correspond to a portion of a character rather than a full character. The fetched block of data is preferably provided to a fetch buffer.

At least a portion of the block is converted into at least a part of a character using an encoding scheme (step 104). In one implementation, the conversion is performed using a converter. Also, in one implementation, the encoding scheme is implemented using a mixed-byte encoding scheme. However, other suitable encoding schemes can be used. In one implementation, the portion of the block converted in step 104 corresponds to an integral number of characters. In one implementation, all of the characters that can be completely converted from the block of data are converted in step 104. In the example above, m bytes of data would be converted in step 104. Thus, if the character-based data in the block corresponds to an integral number of characters (e.g., n=m), then the block may be completely converted in step 104. In one implementation, another amount of data may be converted. Step 104 can include providing the converted data (e.g., the characters) to a conversion buffer.

A remaining part of the character-based data, if any, is retained (step 106). The remaining part corresponds to at least a portion of a character. If the entire block of character-based data corresponds to an integral number of characters, then no data is retained in step 106. However, if there is any character-based data that corresponds only to a part of a character, then that character-based data is retained without being converted in step 106. Thus, in the example above, n–m bytes of data are retained. In one implementation, the character-based data is retained within the converter. However, in another implementation, the character-based data may be retained in another location including but not limited to the fetch buffer. Moreover, if each block corresponds to less than one character, then the block(s) are retained until at least one character can be converted. Moreover, in one implementation, retaining the data also includes retaining any unused but converted characters. For example, if the request is for q characters, p characters are converted and p>q, then in one implementation, p–q characters are retained, for example in a conversion buffer.

The steps 102, 104, and/or 106 may be optionally repeated (step 108). Thus, the remaining part of the block may be converted as part of a next conversion if the next conversion includes the character in step 108. In such a case, the next block of character-based data may be fetched when step 102 repeats. Because data streaming is being performed, the next block of character-based data would be next in sequence to the block previously processed. Consequently, the next block of character-based data would either contain additional data for the character currently being processed or data for the next character. The retained data would be combined with character-based data from the next block(s) and converted to form at least a part of the character or at least a part of an additional character. This process may be repeated until the request is satisfied. Thus, the number of characters requested may be fulfilled using the method 100.

Using the method 100, streaming of character-based data, particularly character-based data employing coding using a variable number of bytes per character, may be efficiently performed. Because only complete characters are converted and the remainder of data retained, a chunk of data large enough to satisfy any request (e.g., an entire document) need not be fetched in response to all requests. Instead, smaller blocks of data may be fetched. Further, because smaller blocks may be fetched sequentially until the request is fulfilled, only enough data to satisfy the particular request being processed may be fetched. Because less character-based data may be fetched, character-based data need not be converted and discarded. Thus, streaming of character-based data may have improved efficiency.

Figure 4:
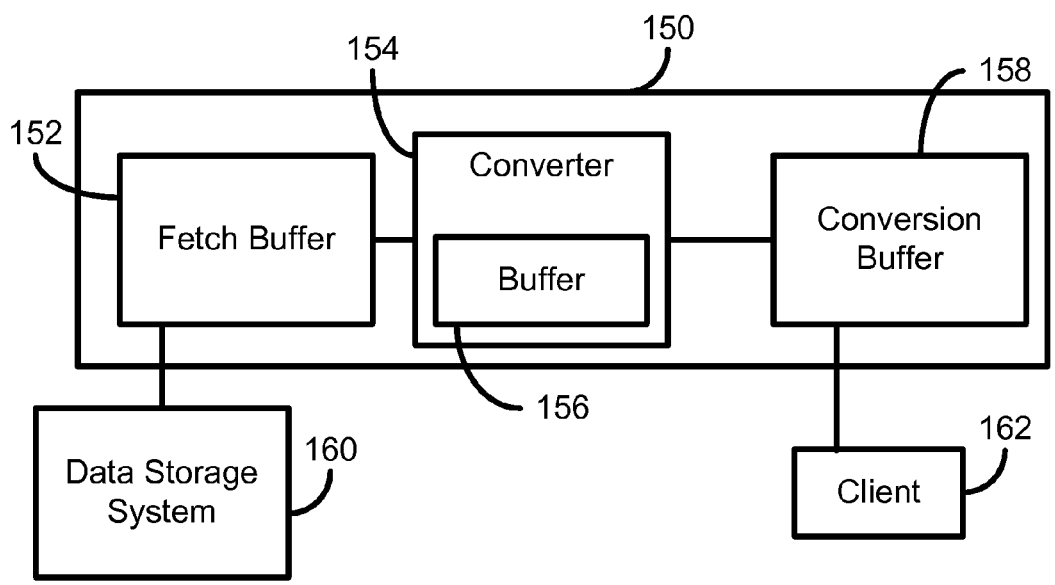
FIG. 4 is a diagram of one implementation of a system in accordance with the present invention for performing data streaming of character-based data.

FIG. 4 is a diagram of a system 150 for performing data streaming of character-based data that may use an encoding scheme having a variable number of bytes per character. In one implementation, the system 150 includes a fetch buffer 152, a converter 154, and a conversion buffer 158. Also depicted are storage system 160 and client 162 to which the system 150 is coupled. The converter 154 includes a buffer 156.

The system 150 will now be described in conjunction with the method 100. The fetch buffer 152 is used to store the blocks of data fetched from the storage system 160, in response to a request from the client 162 for a specified number of characters. In one implementation, the fetch buffer 152 is implemented as a byte array. The size of the fetch buffer 152 may depend upon the application for which the data streaming is performed. In general, the fetch buffer 152, and thus the block of character-based data fetched from the storage system 160, can be relatively small. This aids in reducing the amount of excess data fetched from the storage system 160 for a particular request. In one implementation, the fetch buffer 152 may have another size. For example, a large fetch buffer 152 may aid in reducing traffic to the storage system 160, which may be desirable in some applications.

The converter 154 converts the data and performs step 104 of the method 100. In addition, the converter 154 retains the remaining portion of the block of character-based data not converted. Thus, (in one implementation) the converter 154 performs step 106 of the method 100. For example, the converter 154 may retain the remaining portion of the block in the buffer 156. In one implementation, the remaining portion of the block may be retained in another portion of the system 150 including but not limited to the fetch buffer 152 or another location (not shown in FIG. 4).

The data converted (the characters) are provided to the conversion buffer 158. Thus, the conversion buffer 158 stores those characters that have been converted. In addition, the client 162 can receive the characters from the conversion buffer 158. The conversion buffer 158 may also store characters that are converted but are not provided to the client 162 because the conversion buffer 158 may store more characters than are needed to fulfill a request. The conversion buffer 158 is preferably a character array. In addition, the size of the conversion buffer 158 is preferably the same as the fetch buffer 152.

Thus, using the system 150 blocks of character-based data can be fetched and at least a portion of each block converted into characters by the converter 154. The characters can be stored in the conversion buffer 158. In addition to converting data, the converter 154, or another component, can store a remaining portion of the block not converted into character data. Thus, the system 150 may perform streaming of character-based data, particularly character-based data employing coding using a variable number of bytes per character, more efficiently. Because only complete characters are converted and the remainder of data retained, a chunk of data large enough to satisfy any request (e.g., an entire document) need not be fetched in response to all requests. Instead, smaller blocks of data may be fetched. Further, because smaller blocks may be fetched sequentially until the request is fulfilled, only enough data to satisfy the particular request being processed may be fetched. Because less character-based data may be fetched, character-based data need not be converted and discarded. Thus, streaming of character-based data may have improved efficiency.

Figure 5:
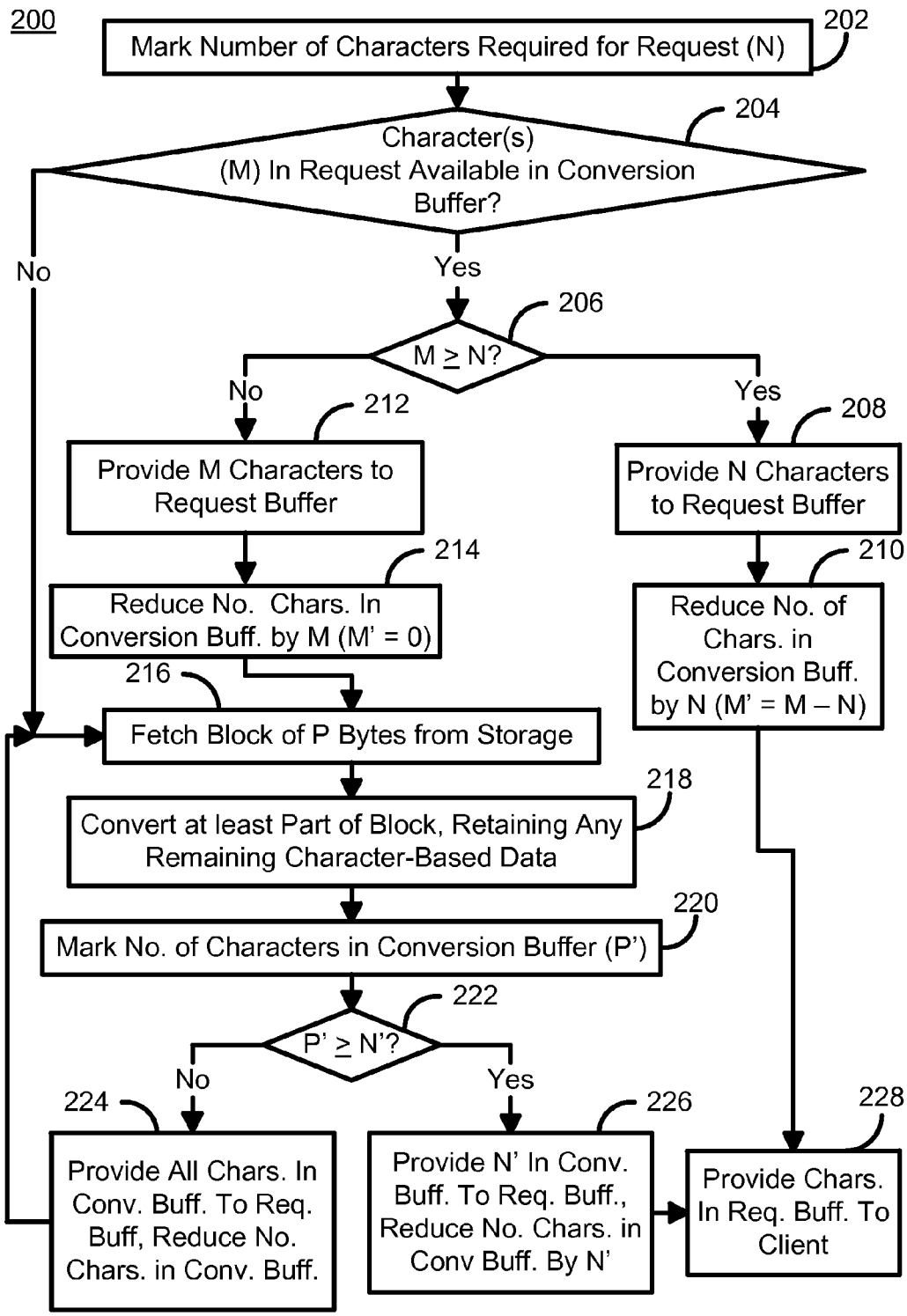
FIG. 5 is a flow chart depicting another implementation of a method for performing data streaming of character-based data.

FIG. 5 is a flow chart depicting a method 200 for performing data streaming of character-based data that may use an encoding scheme having a variable number of bytes per character. The method 200 will be described in the context of the system 150. However, another system (not shown) may be used instead. The method 200 commences when a user of a client 162 initiates a request. For the clarity, assume that the request is for n characters and that the fetch buffer 152 and conversion buffer 158 are each capable of holding p bytes and p characters, respectively.

The number of characters required is marked as N, via step 202. It is determined whether characters that are part of the request are already available in the conversion buffer 158, via step 204. If not, then step 216, described below, is performed. Otherwise, the number of characters in the conversion buffer 158, assumed to be M for the purposes of clarity, is determined, via step 206. In one implementation, step 206 also determines whether M greater than or equal to N. If the number of characters available is at least N ($M \geq N$), then N characters are prepared to be provided from the conversion buffer 158 to the client 162, via step 208. In one implementation, the characters available are copied to a request buffer (not shown). The number of available characters in the conversion buffer 158 is reduced by N, via step 210. Thus, M'=M−N is determined. Step 228, discussed below, is then performed.

If the number of characters in the conversion buffer 158 is less than N (M<N), then all of the characters in the conversion buffer 158 are prepared to be output to the client 162, via step 212. The number of characters for the request is reduced by M, via step 214. Therefore, the number of characters in the conversion buffer 158 is zero. In addition, assume that the number of characters needed to satisfy the request is N'=N−M.

A block of character-based data is fetched from the storage system 160, via step 216. In one implementation, the block of character-based data includes P bytes because the block fetched is preferably fills the fetch buffer 152. At least a portion of the block of character-based data is converted to at least a portion of a character using the converter 154, via step 218. Because the character-based data may have a variable number of bytes per character and/or because the block may be for a smaller amount of data than a single character, the entire block may not be converted in step 218. Consequently, step 218 also includes retaining any remaining portion of the block of character-based data. In one implementation, the remaining character-based data is simply retained in the converter 154, for example in the buffer 156. However, in an alternate implementation, the remaining character-based data may be retained elsewhere.

The number of characters in the conversion buffer 158 is marked, via step 220. For clarity, the number of characters in the conversion buffer 158 during the marking step 220 is P'. It is determined whether the number of characters in the conversion buffer 158 is less than the number of characters required to fulfill the request (P'<N'), via step 222. If so, then all of the characters in the conversion buffer 158 are provided to the requester, for example, by copying the characters to the request buffer, and reducing the number of characters required to fulfill the request by the number of characters in the conversion buffer 158 (N''=N'−P'), via step 224. Step 216 is then returned to so that another block of data may be fetched from the storage system.

If the number of characters in the conversion buffer 158 is greater than or equal to the number of characters required to fulfill the request ($P' \geq N'$), then the number of characters required to fulfill the request are provided to the client 162, via step 226. Also in step 226 the number of available characters in the conversion buffer 158 is reduced by the number of characters required to fulfill the request (P'''=P'−N'). It is ensured that the number of characters, N, requested are provided to the client 162, via step 228. Step 228 is preferably performed by providing the contents of the request buffer to the client 162. Thus, the request is fulfilled.

Using the method 200, streaming of character-based data, particularly character-based data employing coding using a variable number of bytes per character, may be efficiently performed. Because only complete characters are converted and the remainder of data retained, a chunk of data large enough to satisfy any request (e.g., an entire document) need not be fetched in response to all requests. Instead, smaller blocks of data may be fetched. Further, because smaller blocks may be fetched sequentially until the request is fulfilled, only enough data to satisfy the particular request being processed may be fetched. Because less character-based data may be fetched, character-based data need not be converted and discarded. Thus, streaming of character-based data may have improved efficiency.

A method and system for performing character streaming for encoding including mixed-byte encoding. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made without departing from the scope of the appended claims.

What is claimed is:

1. A computer readable medium encoded with a computer program for performing streaming of character-based data from a storage system, the computer readable medium comprising computer executable code for:
   fetching a block of data from the storage system, the character-based data including the block of the data;
   converting at least a portion of the block of the data into at least a part of a character;
   retaining a remaining part of the block, if any, the remaining part of the block of the data corresponding to at least one of at least a portion of the character and at least a portion of an additional character; and
   converting the remaining part of the block of the data into at least one of the at least the portion of the character and the at least the portion of the additional character in a next conversion responsive to the next conversion including the character or the additional character.

2. The computer readable medium of claim 1, wherein:
   the character-based data is stored in the storage system; and
   fetching a block of data from the storage system further includes fetching the block of data from the storage system to a fetch buffer.

3. The computer readable medium of claim 1, wherein converting the at least the portion of the block of the data further includes using a converter to convert the at least the portion of the block of the data.

4. The computer readable medium of claim 3, wherein converting the at least the portion of the block of the data further includes providing at least one character to a conversion buffer.

5. The computer readable medium of claim 3, wherein retaining a remaining part of the block includes retaining the remaining part, if any, in the converter.

6. The computer readable medium of claim 1, wherein:
   at least a portion of the character-based data corresponds to a request for a particular number of characters; and
   retaining a remaining part of the block includes retaining at least one completed character responsive to the conversion of the remaining part of the block of the data providing a number of characters greater than the particular number of characters.

7. The computer readable medium of claim 1, wherein:
   at least a portion of the character-based data corresponds to a request; and
   the computer program further comprises computer executable code for determining whether retained data corresponding to one or more characters in the request is available prior to fetching the block of the data.

8. The computer readable medium of claim 7 wherein the computer executable code for fetching a block of data from the storage system further includes computer executable code for fetching the block of data responsive to the retained data is not being present, wherein the block of data includes data corresponding to at least a portion of a first character of the request.

9. The computer readable medium of claim 1, wherein the character-based data is encoded using an encoding scheme having a variable number of bytes per character.

* * * * *